US006748698B1

(12) United States Patent
Pratt

(10) Patent No.: US 6,748,698 B1
(45) Date of Patent: Jun. 15, 2004

(54) WATER FLOW CONTROL SYSTEM

(75) Inventor: Christopher J. Pratt, Coventry (GB)

(73) Assignee: Coventry University, Coventry (GB)

( * ) Notice: Subject to any disclaimer, the term of this patent is extended or adjusted under 35 U.S.C. 154(b) by 0 days.

(21) Appl. No.: 09/700,968

(22) PCT Filed: May 17, 1999

(86) PCT No.: PCT/GB99/01555
§ 371 (c)(1),
(2), (4) Date: Jul. 11, 2002

(87) PCT Pub. No.: WO99/59397
PCT Pub. Date: Nov. 25, 1999

(30) Foreign Application Priority Data

May 16, 1998 (GB) .............................................. 9810444

(51) Int. Cl.[7] .............................................. A01G 25/00
(52) U.S. Cl. .............................. 47/79; 47/66.7; 47/32.7; 47/75; 47/73; 47/65.6
(58) Field of Search ................................. 47/32.4, 32.6, 47/32.7, 66.7, 73, 79, 32.8, 75, 76, 65.8, 65, 77, 85, 86, 48.5; 404/2

(56) References Cited

U.S. PATENT DOCUMENTS

| | | | | | |
|---|---|---|---|---|---|
| 968,226 | A | * | 8/1910 | Ziller | |
| 1,906,494 | A | * | 5/1933 | Steward | |
| 3,005,287 | A | * | 10/1961 | Dudley | |
| 4,236,351 | A | * | 12/1980 | Smith | 47/79 |
| 4,920,694 | A | * | 5/1990 | Higa | 47/58 |
| 5,064,308 | A | * | 11/1991 | Almond et al. | 405/43 |
| 5,099,603 | A | * | 3/1992 | Rigsby | 47/48.5 |
| 5,363,592 | A | * | 11/1994 | Weder et al. | 47/58 |
| 5,589,240 | A | | 12/1996 | Hunter | 428/34.1 |
| 5,878,528 | A | * | 3/1999 | Pattyn | 47/25 |

FOREIGN PATENT DOCUMENTS

| | | | | |
|---|---|---|---|---|
| DE | 003633390 A1 | * | 4/1988 | A01G/9/02 |
| DE | 003821605 A1 | * | 2/1989 | A01G/13/02 |
| DE | 42 08 740 A1 | | 9/1992 | |
| EP | 00552722 A1 | * | 1/1993 | E01C/3/00 |
| EP | 0 786 034 B1 | | 7/1997 | |
| GB | 2108549 A | * | 10/1982 | E01C/9/00 |
| GB | 2227775 A | * | 8/1990 | E01C/11/22 |
| JP | 403166428 | * | 7/1991 | E03B/3/02 |
| WO | WO 89/4600 | * | 6/1989 | A01G/31/02 |
| WO | WO 96/12067 | | 4/1996 | |

* cited by examiner

Primary Examiner—Peter M. Poon
Assistant Examiner—Andrea M. Valenti
(74) Attorney, Agent, or Firm—Fulwider Patton Lee & Utecht, LLP

(57) ABSTRACT

A planting system for regulating the supply of water to a plant comprises a linear (28) for containing a volume of plant growing medium (30), such as soil, and drainage means adapted to drain water from the plant growing medium (30) contained within the liner (28) and convey the drained water to a desired location. A paving system (10) comprises a permeable layer (12) providing an upper surface; at least one supporting substrate layer (20) thereunder which is permeable to liquid, a containment membrane (28) of impermeable material containing said substrate layer (20) for controlled retention of water therein and duct means for allowing the passage of water from the substrate layer (20) to a plant growing medium (30).

6 Claims, 2 Drawing Sheets

WATER FLOW CONTROL SYSTEM

The present invention relates to a planting system for regulating the supply of water to a plant and to a paving system incorporating such a planting system.

It is known to plant plants in a plant growing medium contained within a liner, supported by the surrounding substrate layer, in order to provide a controlled environment for that plant. In order to prevent excess water collecting in the linear and causing the plant to become water logged, it is known to provide drainage holes in the linear to allow water to drain from the plant growing medium to the substrate layer. In sites where it is generally desirable to prevent water from draining into the surrounding substrate layer, for example where the substrate is a potential source of pollution, such as a landfill site, it is not possible to use such a planting system.

It is known from European Patent No 0 786 034 to provide a paving system for spillage or floodwater management comprising a permeable layer providing an upper surface; at least one supporting substrate layer thereunder which is permeable to liquid and a containment membrane of impermeable material containing said substrate layer for controlled retention of liquid therein. In a preferred embodiment of the paving system described in that specification, the paving system is provided with valves and discharge ducts for drainage. The paving system according to European Patent No 0 786 034 is particularly suitable for use in areas where there is a risk of spillage of fluids which must be prevented from entering the environment before treatment. It is a disadvantage of the paving system according to European Patent No 0 786 034 that, where it is used in areas where there is no such risk, the surface water which drains from it must either be discharged to waste or to a storage tank for further use.

The present invention seeks to provide an improved planting system.

Accordingly, the present invention provides a planting system for regulating the supply of water to a plant, the system comprising a liner containing a volume of plant growing medium;
characterized in that:
  the liner is impermeable to water;
  the system further comprises drainage means adapted to drain water from the plant growing medium contained within the liner and conveyor the drained water to a desired location;
  and wherein the liner serves to prevent drainage of water from the medium into the surrounding subsoil.

The present invention further provides a paving system comprising at least a surface layer provided with an island in the form of a hole or trench for receipt of a plant, in combination with a planting system according to the immediately preceding paragraph.

Figure 1:
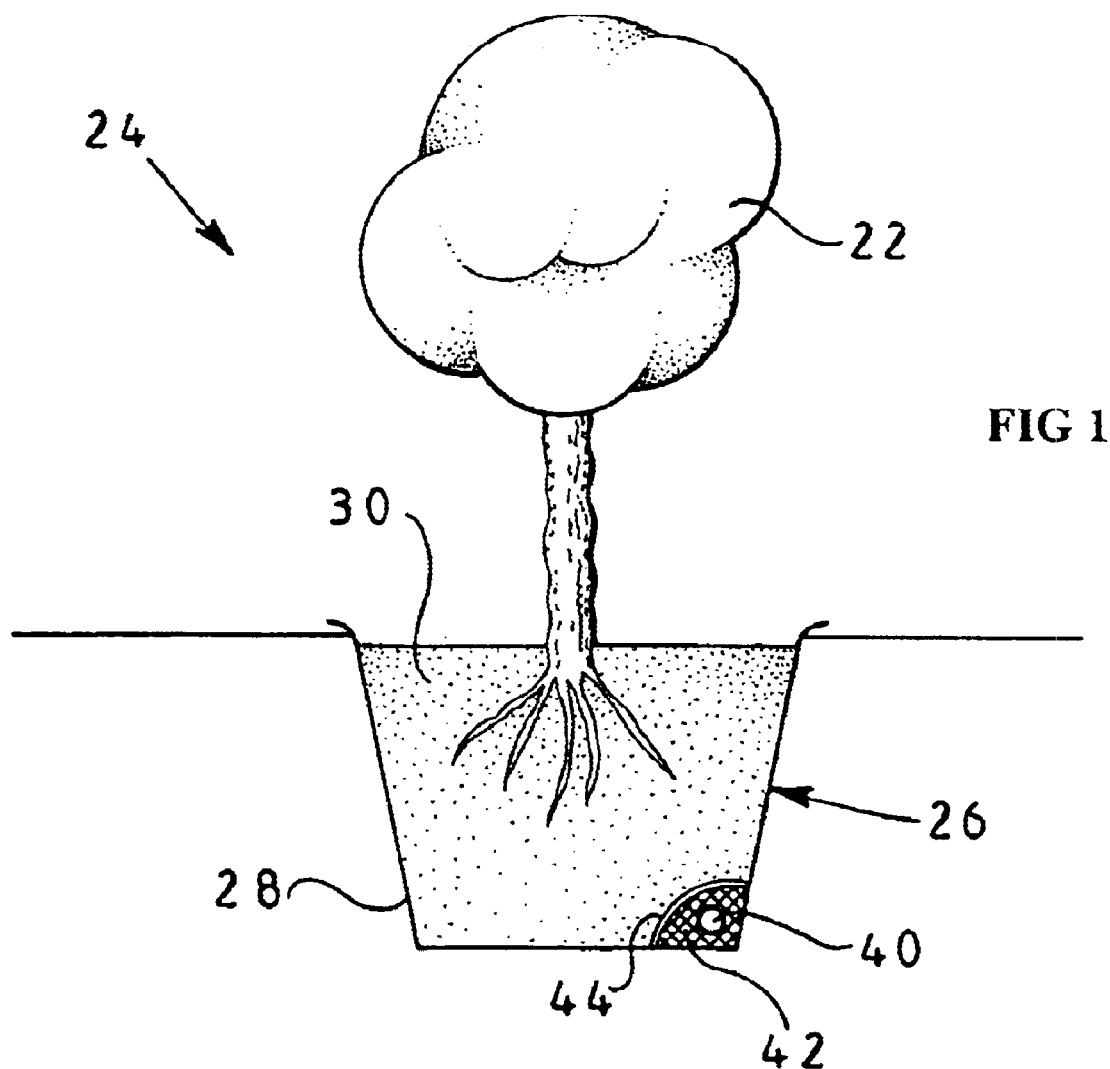
Figure 2:
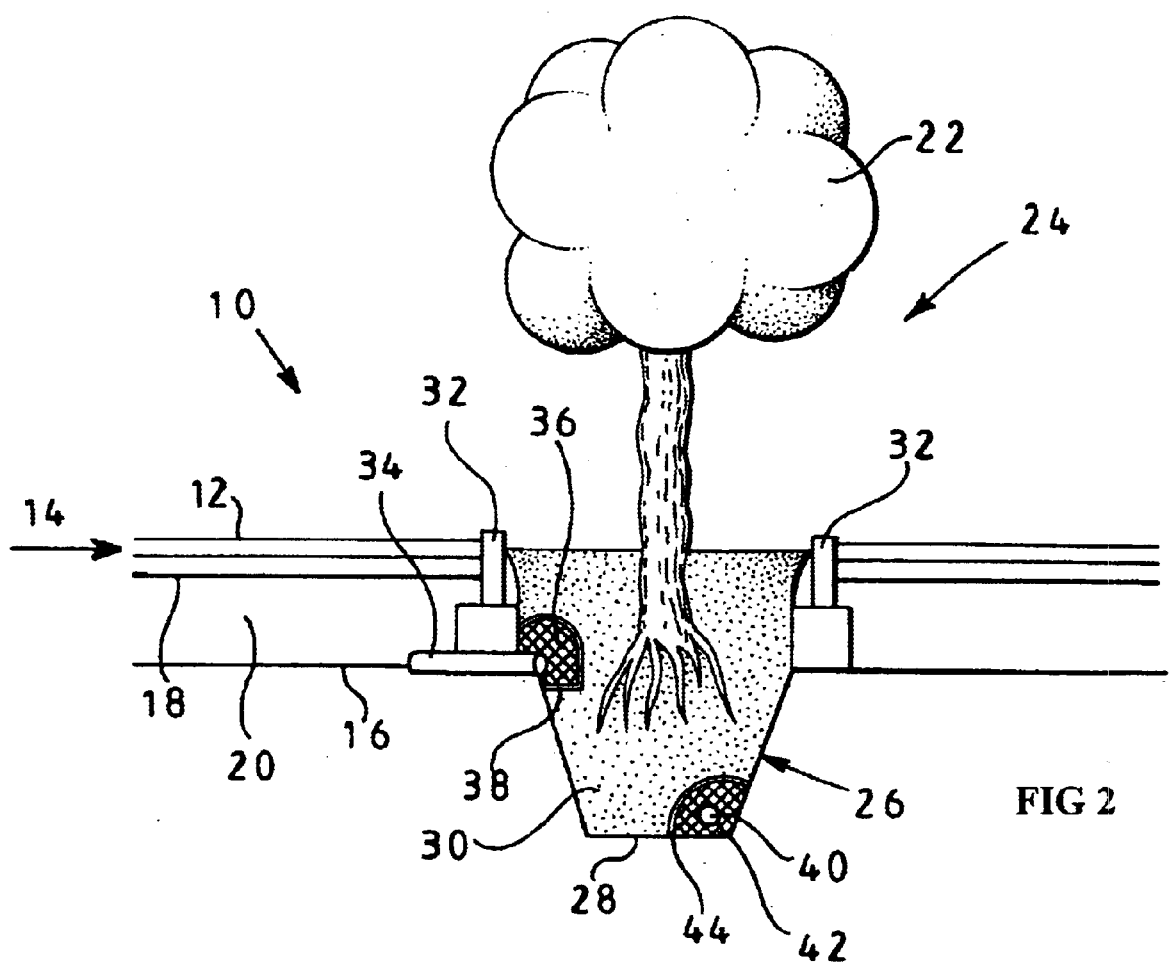
Figure 3:
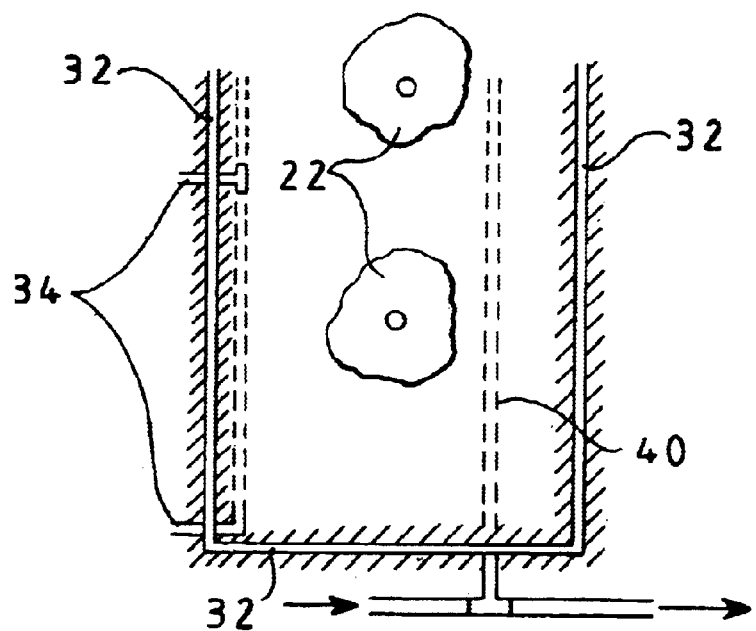

The present invention is further described hereinafter by way of example, with reference to accompanying drawings, in which:
  FIG. 1 is a side elevation, partly in section of an embodiment of a planting system;
  FIG. 2 is a side elevation, partly in section of an embodiment of a paving system; and
  FIG. 3 is a plan view of the embodiment of FIG. 2.

As is shown in FIG. 1, a tree or shrub 22 is planted within an island 24. The island is in the form of a trench or hole 26 which is lined with a layer 28 which is a water impermeable membrane. The membrane 28 covers the bottom and side walls of the hole 26 with the upper edges of the membrane 28 abutting the surface of the surrounding area. Soil 30 is contained in the hole 26 by the membrane 28.

A channel in the form of a pipe 40 which passes through the membrane 28 facilitates drainage of excess water from or into the soil 30.

The channel 40 is conveniently in the form of a perforated pipe and is advantageously surrounded by particulate material such as gravel 42 in turn surrounded by a dispersing layer 44, typically geotextile material.

As can be seen from FIG. 2, if it is desired to plant a tree or shrub 22 within an area covered by a paving system 10 this can be achieved by using the "island" 24 of FIG. 1. The paving system has a surface layer 12 which is a permeable layer to allow liquid such as rain water to run through into a channel 14 formed by a containment layer 16. The containment layer 16 is impervious to liquid and is conveniently in the form of a plastics membrane.

The permeable layer 12 may be a single sheet laid or cast over the whole of, or a large section of, an area e.g. asphalt or concrete, which is porous. Perforations, conveniently in the form of simple holes, may be provided in a layer of normally impervious material to render the layer porous to liquid. However, it is advantageous to have holes of small span to stop ingress of foreign objects, but of long periphery to facilitate dispersion of the liquid underneath the pavement. Slot-like holes are therefore attractive, and these can conveniently be provided by grooves on the outside of prefabricated pavings.

In a further preferred arrangement, the layer 12 may be formed by discrete pavings of such size and mass as to be convenient to handle continually without fatigue, and designed to be laid close-fitting without mortar or cement. They may be made in any material suitable for any particular application, such as brick, concrete or cast iron, and must be of sufficient depth to ensure dispersion of the concentrated loads applied. Concurrently, they are of sufficient depth to prevent them tipping over under load, given the lateral freedom allowed by close-fitting laying. Pavings may have holes through them, but from many points of view it is preferable that the perforations be grooves in the interfaces separating adjacent pavings. Paviours find this type of pavement cheap and easy to lay, with the further advantage that pavings can easily be lifted when required.

The incorporation of raised pads on the upper surfaces of at least some of the pavings prevents compression of the gravel fillings around the paving and reduces the danger of hydroplaning in storm conditions, and is a preferred feature.

A dispersing layer 18 of gravel is provided beneath the permeable layer 12 with a further substrate layer 20 of, for example, crushed stone provided beneath the dispersing layer 18 and above the containment layer 16. The dispersing layer 18 is for dispersing liquid permeating from the permeable layer 12.

A filtering layer (not shown) may be provided intermediate the permeable layer 12 and dispersing layer 18 or more preferably between the dispersing layer 18 and the substrate layer 20 for filtering solids from liquid permeating through the permeable layer 12. The filtering layer is conveniently a geotextile layer. This is preferably between 1 mm and 1.5 mm thick.

The containment layer 16 is preferably between 1 mm and 1.5 mm thick.

The layer 18 is of gravel or crushed gravel or other small grained particulate material (the dispersing layer 18). Where the permeable layer 12 is perforated, the same or similar material is dropped into the perforations (and around any raised pads which may be present where the layer 12 is of discrete pavings or paving slabs). The layer 18 is a material which is not readily friable, dissolved or susceptible to frost and is substantially inert to water. The particular size is preferably of a minimum 5 mm diameter to a maximum of 10 mm diameter. The particular size may vary within the above range in the layer 18.

This particulate layer 18 provides a flat surface for paving slabs and ensures that the geotextile filtering layer beneath it is uniformly loaded. Moreover, it helps to disperse the fluid from the surface layer 12 uniformly over the surface of the geotextile layer, and provides an initial screening of the fluid to minimise clogging of the geotextile layer beneath.

Beneath the geotextile layer is the substrate proper (the substrate layer 20) which lies on, and is contained by, the containment layer 16 described above. This substrate layer 20 is a deep layer of mainly hard nodules. These could be hollow, and there may be advantage in some being hollowed out or drilled as described below, but they are most efficient when solid. They are of irregular or lobate form so that they remain firmly in place under load but are surrounded by interstitial cavities in which the drained fluid can dwell.

These nodules may be of any suitable material: crushed stone, pebbles and blast furnace slag are typical examples, but special materials or shapes may be needed in particular applications. The size and type of nodule affects the storage and release capabilities of the system. The material used for the substrate layer 20 is also a material which is not readily friable, dissolved or susceptible to frost. It is also substantially inert to water. The material consists of particles of differing sizes in the range 15 mm to 300 mm (preferably 15 mm to 200 mm) and the particle size may vary within the substrate layer. However, the majority of particles in the material are preferably of a size nearer the lower end of this range.

The membrane 28 covers the bottom and side walls of the hole 26 with the upper edges of the membrane 28 abutting or mating with the containment layer 16.

The paving system 10 is separated from soil 30 contained in the hole 26 by a wall or walls 32 (such as kerb stones) which are generally impervious to water and which therefore prevent the unrestricted flow of water into the soil contained by the membrane 28.

In order to allow a regulated flow of water from the paving system 10 into the soil 30 for the tree or bush 22, one or more openings are provided in the walls 32. These openings are conveniently formed by one or more pipes 34 which pass from the substrate layer 20 through the wall or walls 32 and open into an area of gravel 36 covered by a further filtering layer 38 which is again conveniently a geotextile material layer.

The pipes 34 can extend both into the gravel 36 and into the substrate 20 and may be perforated for ease of flow of water.

The geotextile layer 38 disperses the water from the pipes 34 into the soil surrounding the tree or bush 22.

The substrate 20 and particulate material 36, 42 may be similar or of the same type.

FIG. 3 is a plan view of the system of FIG. 2 showing the walls 32, two trees or bushes 22, the pipes 34 and the drainage pipe 40.

It will be appreciated that the present invention is also suitable for use with existing paving systems where the upper surface layer is not permeable. In such cases, surface water lying on the upper surface layer may run off the surface and into the plant growing medium. This supply of run-off water could replace or complement the water supplied through the pipe or pipes 34 in order to irrigate the plant in the plant growing medium.

What is claimed is:

1. A system for regulating the supply of water to a plant, the system comprising:

a permeable surface layer providing an upper surface;

at least one supporting substrate layer thereunder which is permeable to liquid;

an island in the form of a hole or trench formed in said surface layer for receipt of a plant;

a liner in said hole or trench containing a volume of plant growing medium, the liner being impermeable to water;

drainage means adapted to drain water from the plant growing medium contained within the liner and convey the drained water to a desired location;

wherein the drainage means is a pipe, the section of the pipe located within the liner is surrounded by a particulate material, and the particulate material is surrounded by a dispersing layer;

and duct means for allowing the regulated passage of water from said substrate layer to the plant growing medium.

2. A system according to claim 1 wherein the liner is a plastics material.

3. A system according to claim 1 wherein the pipe is provided with perforations.

4. A system according to claim 1 wherein the particulate material is gravel.

5. A system according to claim 1 further comprising a containment layer containing said substrate layer for preventing egress of water from said supporting substrate layer into surrounding ground.

6. A system according to claim 5 wherein the substrate layer is partially or fully divided by one or more impermeable divider or weir means into sections within the containment layer containing the substrate layer.

* * * * *